(12) United States Patent
Du et al.

(10) Patent No.: US 12,397,442 B2
(45) Date of Patent: Aug. 26, 2025

(54) HAPTIC SYSTEM FOR ROBOT TELEOPERATION IN CONFINED SPACES

(71) Applicant: UNIVERSITY OF FLORIDA RESEARCH FOUNDATION, INCORPORATED, Gainesville, FL (US)

(72) Inventors: Jing Du, Gainesville, FL (US); Qi Zhu, Gainesville, FL (US); Tianyu Zhou, Gainesville, FL (US)

(73) Assignee: UNIVERSITY OF FLORIDA RESEARCH FOUNDATION, INCORPORATED, Gainesville, FL (US)

( * ) Notice: Subject to any disclaimer, the term of this patent is extended or adjusted under 35 U.S.C. 154(b) by 222 days.

(21) Appl. No.: 18/330,576

(22) Filed: Jun. 7, 2023

(65) Prior Publication Data

US 2023/0398695 A1 Dec. 14, 2023

Related U.S. Application Data

(60) Provisional application No. 63/366,092, filed on Jun. 9, 2022.

(51) Int. Cl.
*G06F 3/01* (2006.01)
*B25J 9/16* (2006.01)
*B25J 13/00* (2006.01)

(52) U.S. Cl.
CPC ............. *B25J 13/00* (2013.01); *B25J 9/1689* (2013.01); *G06F 3/011* (2013.01); *G06F 3/016* (2013.01)

(58) Field of Classification Search
CPC .......... B25J 13/00; B25J 9/1689; B25J 9/065; G06F 3/011; G06F 3/016; G06F 3/017; G05B 2219/40234; G05B 2219/45066; G05B 2219/45233
See application file for complete search history.

(56) References Cited

U.S. PATENT DOCUMENTS

2019/0054374 A1* 2/2019 Pesante ................. A63F 13/285
2024/0099934 A1* 3/2024 Stanfield ................ A41D 13/12

* cited by examiner

*Primary Examiner* — Michael C Zarroli
(74) *Attorney, Agent, or Firm* — ALSTON & BIRD LLP

(57) ABSTRACT

A system, apparatus, and method are provided for remote control of a robotic device, and more particularly, to a haptic system for robot teleoperation in confined spaces. A haptic feedback system for robot teleoperation is provided including: a robot; a robot control; and an upper-body haptic feedback garment including a first vibrating module array disposed across a front side of an upper body of an operator and a second vibrating module array disposed across a back side of the upper body of the operator, where the upper-body haptic feedback garment provides haptic feedback to the operator reflecting a position and orientation of the robot.

20 Claims, 10 Drawing Sheets

HAPTIC SYSTEM FOR ROBOT TELEOPERATION IN CONFINED SPACES

CROSS-REFERENCE TO RELATED APPLICATIONS

This application claims priority to U.S. Provisional Patent Application No. 63/366,092, filed on Jun. 9, 2022, the contents of which are hereby incorporated by reference in their entirety.

ACKNOWLEDGEMENT OF FUNDING

This invention was made with government support under 2128895 awarded by the National Science Foundation. The government has certain rights in the invention.

TECHNOLOGICAL FIELD

Embodiments of the present disclosure relate generally to remote control of a robotic device, and more particularly, to a haptic system for robot teleoperation in confined spaces.

BACKGROUND

Inspection and repair of objects and systems in confined spaces is challenging and has unique constraints. Robotic systems have been developed to facilitate such inspection and repair, with robots being remotely controlled. One such robot type is a snake robot that has demonstrated significant potential for operations in confined workspaces that are less accessible or are dangerous to human workers, such as within pipes. Pipelines used for water, gas, oil, waste, etc. require regular maintenance and inspection to remain safe and functional. However, these pipes often present conditions that are inaccessible or unsafe for humans. Thus, snake robots can be employed for such maintenance and inspection.

Remote control of such snake robots is a non-trivial task due to the unique locomotion mechanism (e.g., a helical motion) and constraints of the workspaces such as low visibility and indistinguishable features. Generally, operator feedback from such remotely operated robots is limited to a camera view of the workspace from a perspective of the robot. It is difficult for a human operator to develop an accurate spatial understanding of a workspace with such limited visibility which can lead to problems such as disorientation and motion sickness from remote operation of the robot. Embodiments described herein overcome the challenges of remote operation of robots in confined spaces.

BRIEF SUMMARY

A system, apparatus, and method are provided herein for remote control of a robotic device, and more particularly, to a haptic system for robot teleoperation in confined spaces. According to an example embodiment, a haptic feedback system for robot teleoperation is provided including: a robot; a robot control; and an upper-body haptic feedback garment including a first vibrating module array disposed across a front side of an upper body of an operator and a second vibrating module array disposed across a back side of the upper body of the operator, where the upper-body haptic feedback garment provides haptic feedback to the operator reflecting a position and orientation of the robot.

According to an example embodiment, the first vibrating module array includes a first array of vibrating modules and the second vibrating module array includes a second array of vibrating modules. The first vibrating module array includes, in some embodiments, a series of rows and columns of the vibrating modules and the second vibrating module array includes a series of rows and columns of the vibrating modules. The robot of an example embodiment includes a top side and a bottom side, where activation of vibrating modules in a column of the first vibrating module array proximate a middle of the operator's upper body provides an indication to the operator that the robot is oriented with the bottom side down relative to gravitational force. According to some embodiments, activation of the vibrating modules in a column of the second vibrating module array proximate a middle of the operator's upper body provides an indication to the operator that the robot is oriented with the top side down relative to the force of gravity.

According to certain embodiments, activation of the vibrating modules in a row of the first vibrating module array proximate a top of the operator's upper body provides an indication to the operator that the robot is oriented vertically, with a head of the robot oriented up relative to the gravitational force. The robot of some embodiments is a snake robot, where a head of the snake robot includes a camera and an accelerometer, where the accelerometer identifies orientation of the snake robot relative to gravity. According to some embodiments, the system includes a display, where the display provides a view from the camera of the snake robot. Embodiments of the system can include a manual controller, where the manual controller is controlled by an operator to guide movement of the snake robot. According to some embodiments, the upper-body haptic feedback garment provides haptic feedback to the operator responsive to movement of the snake robot guided by the operator with the manual controller. According to some embodiments, the haptic feedback system includes a body motion controller to guide movement of the snake robot. The body motion controller of an example embodiment includes one or more sensors worn by an operator and is configured to translate body motion of the operator into movement guidance for the snake robot.

Embodiments provided herein include a method for robot teleoperation with haptic feedback including: receiving manual control of the robot from an operator; providing haptic feedback to the operator through an upper-body haptic feedback garment, where the haptic feedback is provided by a first vibrating module array disposed across a front side of an upper body of an operator and a second vibrating module array disposed across a back side of the upper body of the operator, where the haptic feedback to the operator reflects a position and orientation of the robot.

According to some embodiments, the first vibrating module array includes a series of rows and columns of vibrating modules and the second vibrating module array includes a series of rows and columns of vibrating modules. The robot of some embodiments includes a top side and a bottom side, the method further including: activating vibrating modules in a column of the first vibrating module array proximate a middle of the operator's upper body to provide an indication to the operator that the robot is oriented with the bottom side down relative to gravitational force. The method of some embodiments further includes activating the vibrating modules in a column of the second vibrating module array proximate a middle of the operator's upper body to provide an indication to the operator that the robot is oriented with the top side down relative to the gravitational force. The method of some embodiments includes activating the vibrating modules in a row of the first vibrating module array proximate a top of the operator's upper body to provide an indication to the operator that the robot is oriented vertically, with a head of the robot oriented up relative to the gravitational force.

Embodiments provided herein include a configurable haptic suit system including: a plurality of attachment points positioned to overlay at least a portion of a front of a torso of a wearer and at least a portion of a back of a torso of a wearer; a plurality of vibrating modules, repositionable among the plurality of attachment points; and a controller configured to activate, deactivate, and vary an intensity an pattern of vibrations of the plurality of vibrating modules. According to some embodiments, each of the plurality of attachment points is associated with a particular location relative to a wearer, where a vibrating module of the plurality of vibrating modules attached to a given attachment point is informed of the particular location relative to the wearer for the given attachment point. According to some embodiments, the vibrating module of the plurality of vibrating modules attached to the given attachment point is controlled according to the particular location relative to the wearer.

The features, functions, and advantages that have been discussed can be achieved independently in various embodiments or may be combined in yet other embodiments; further details of which can be seen with reference to the following description and drawings.

BRIEF DESCRIPTION OF DRAWINGS

Figure 1:
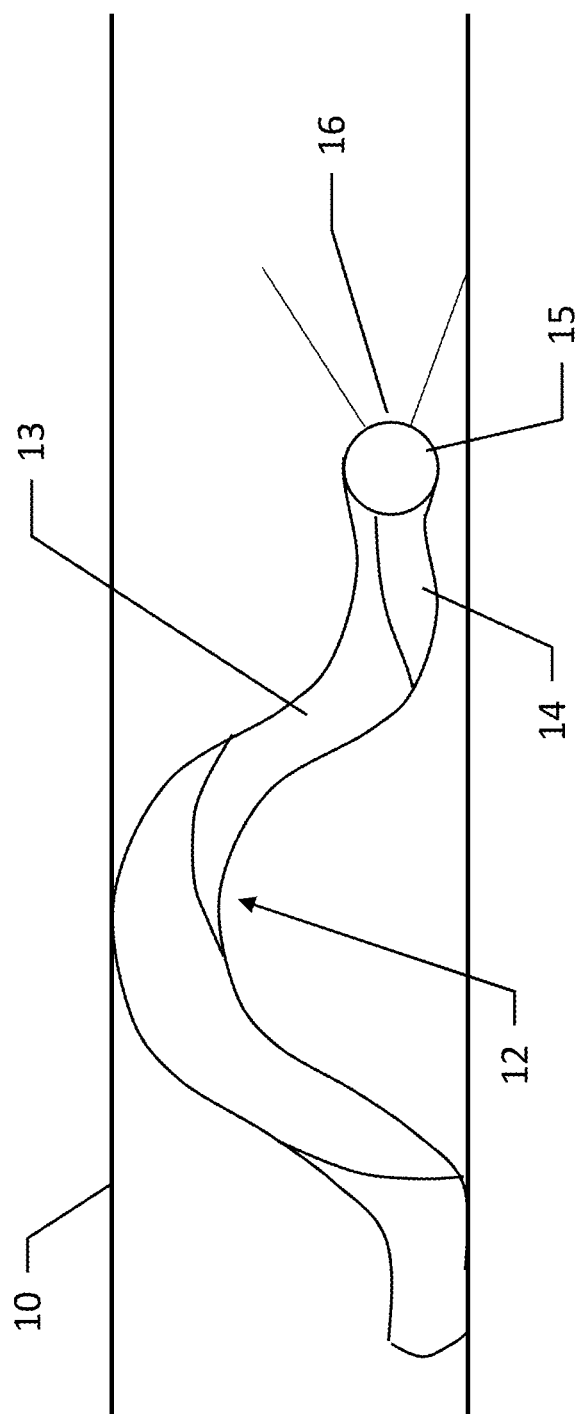
Figure 2:
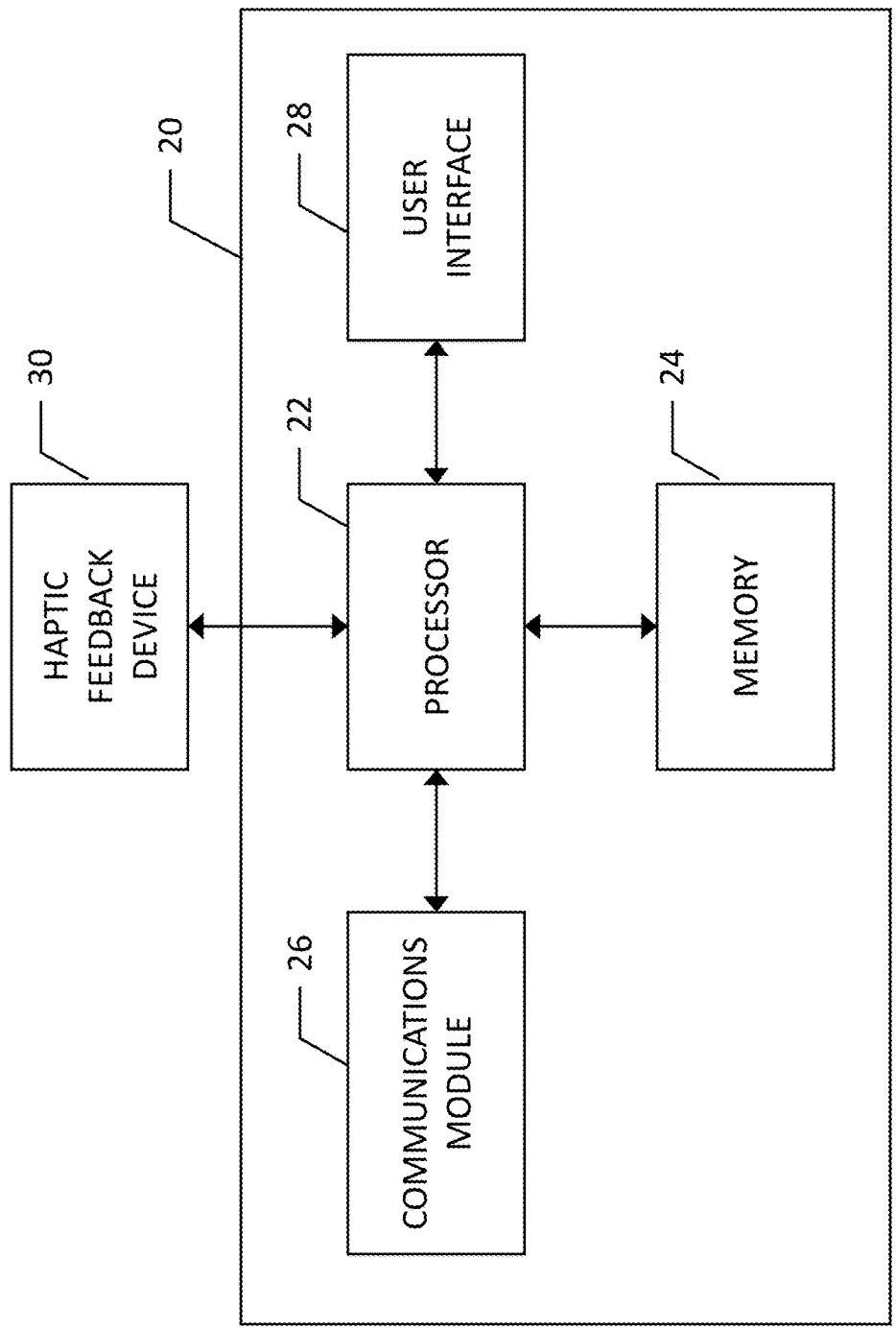
Figure 3:
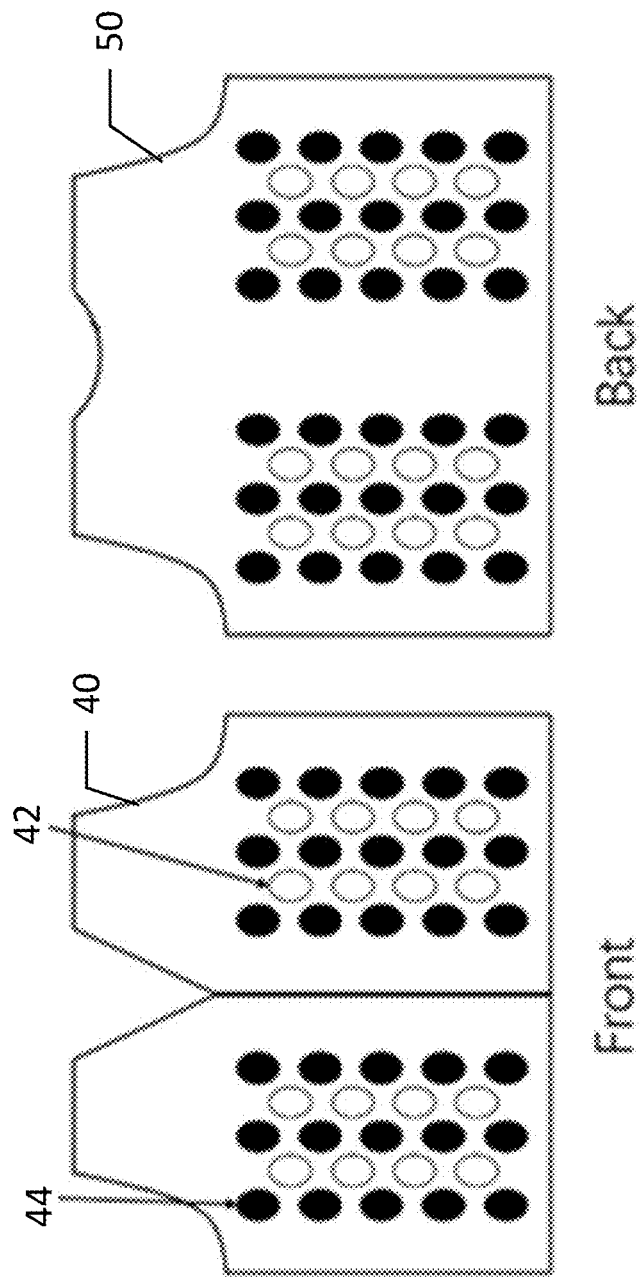
Figure 4:
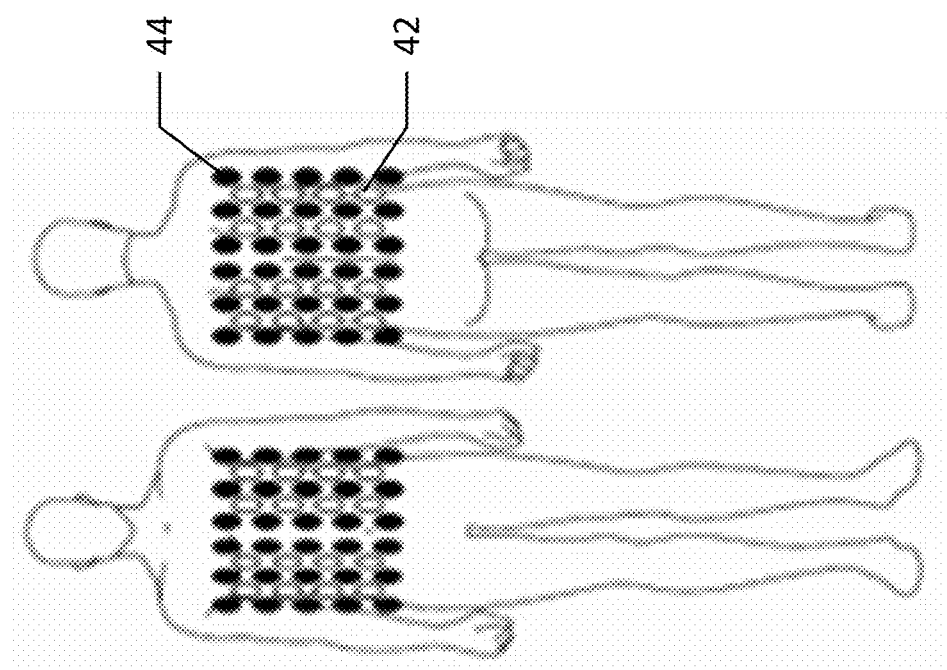
Figure 5:
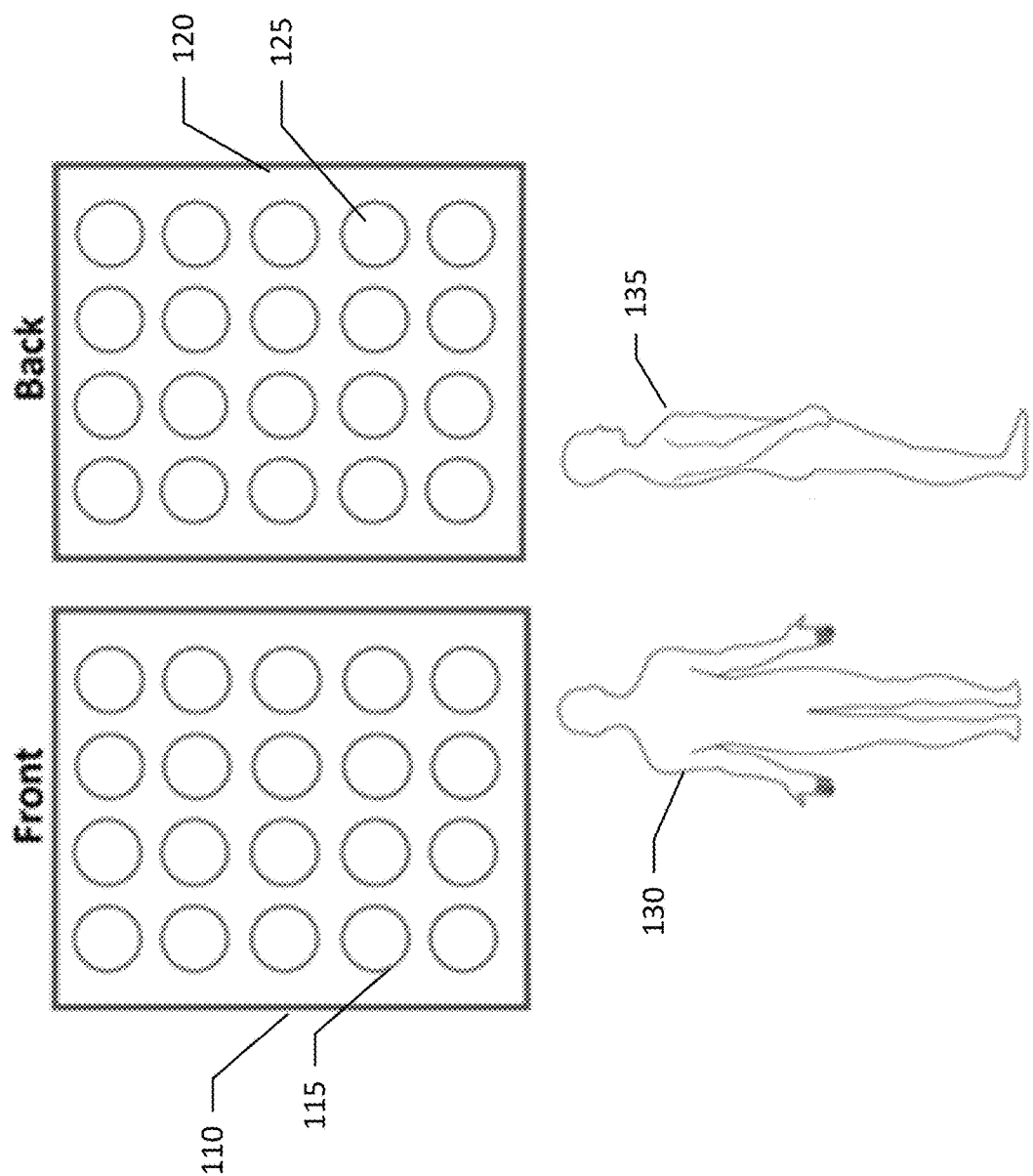
Figure 6:
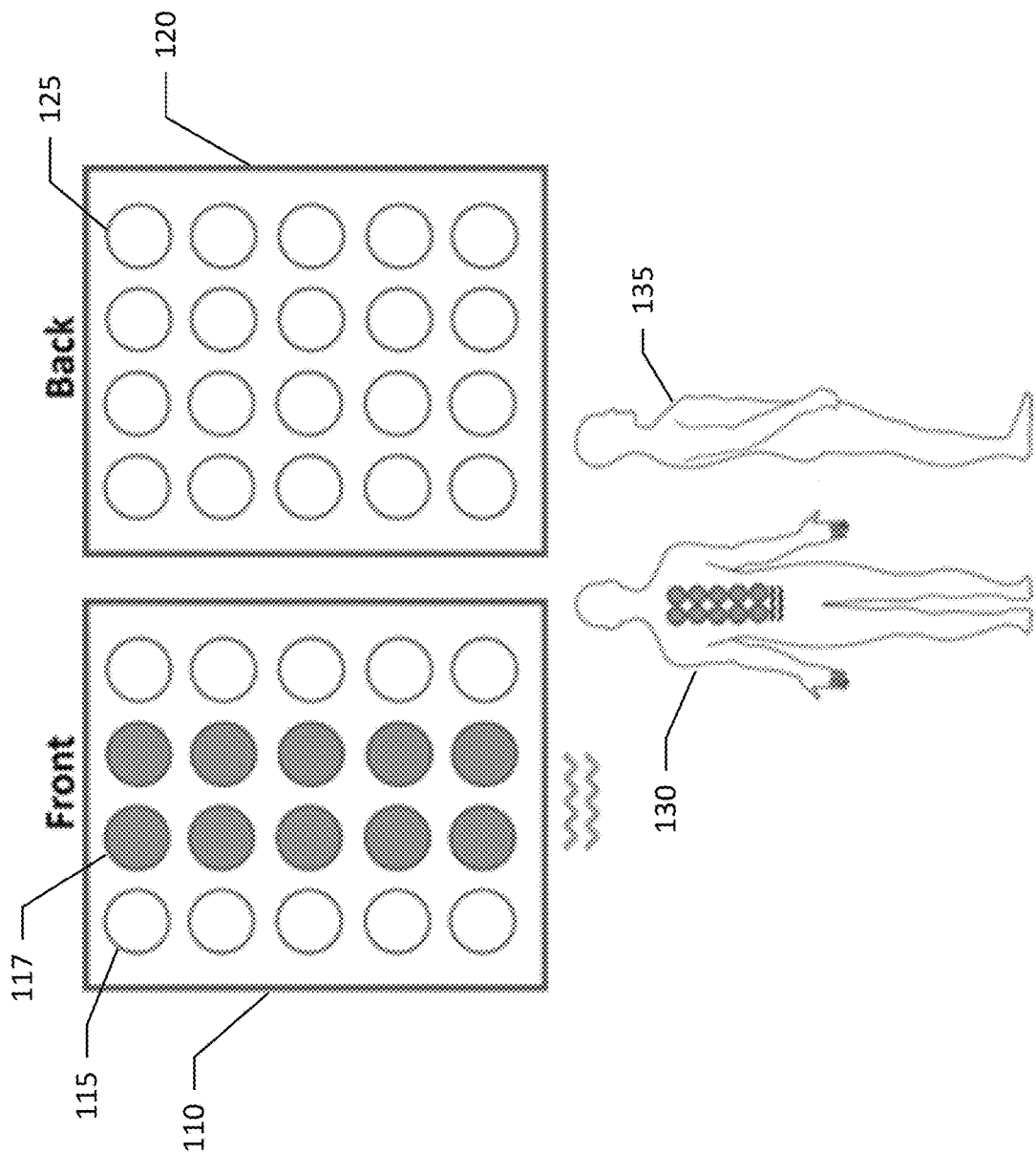
Figure 7:
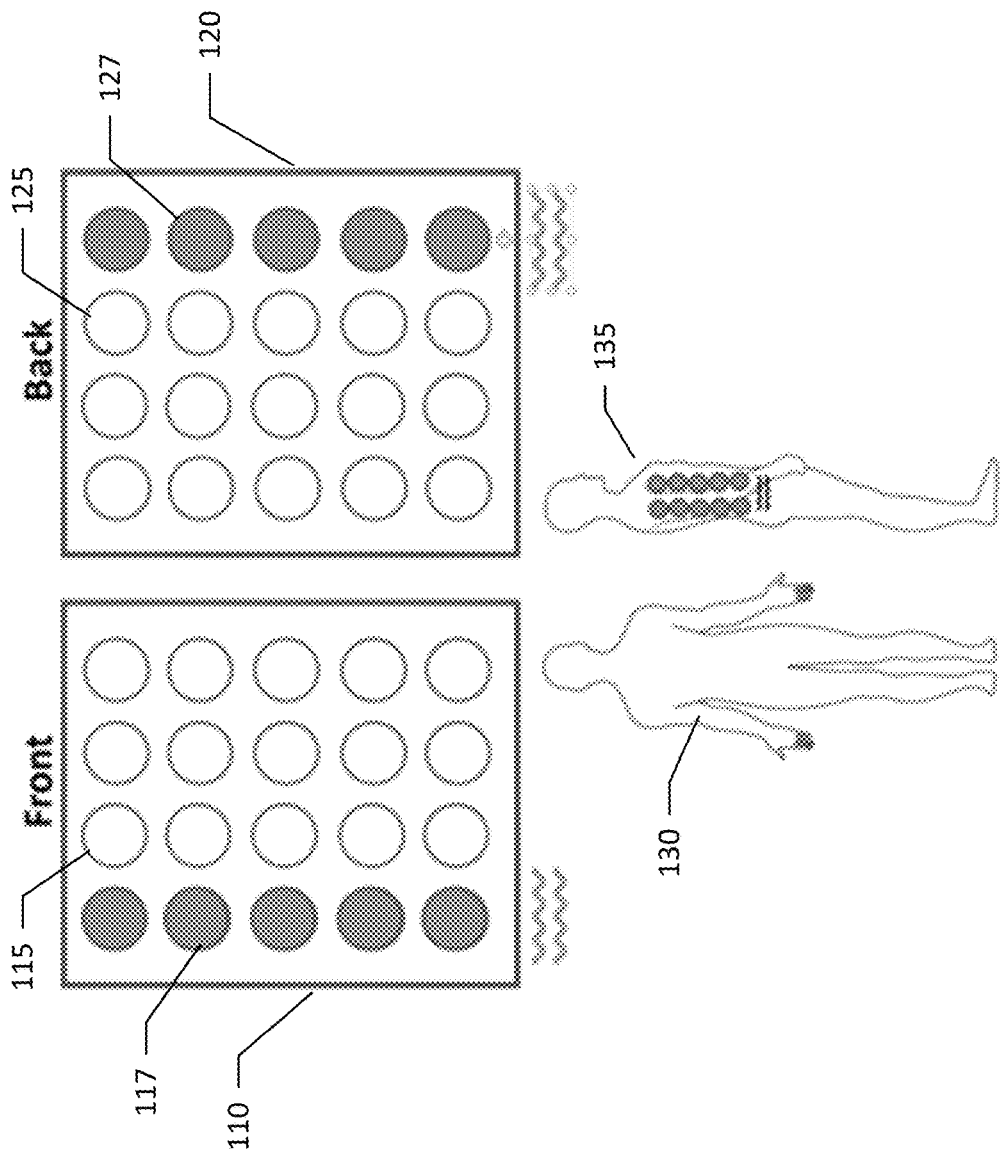
Figure 8:
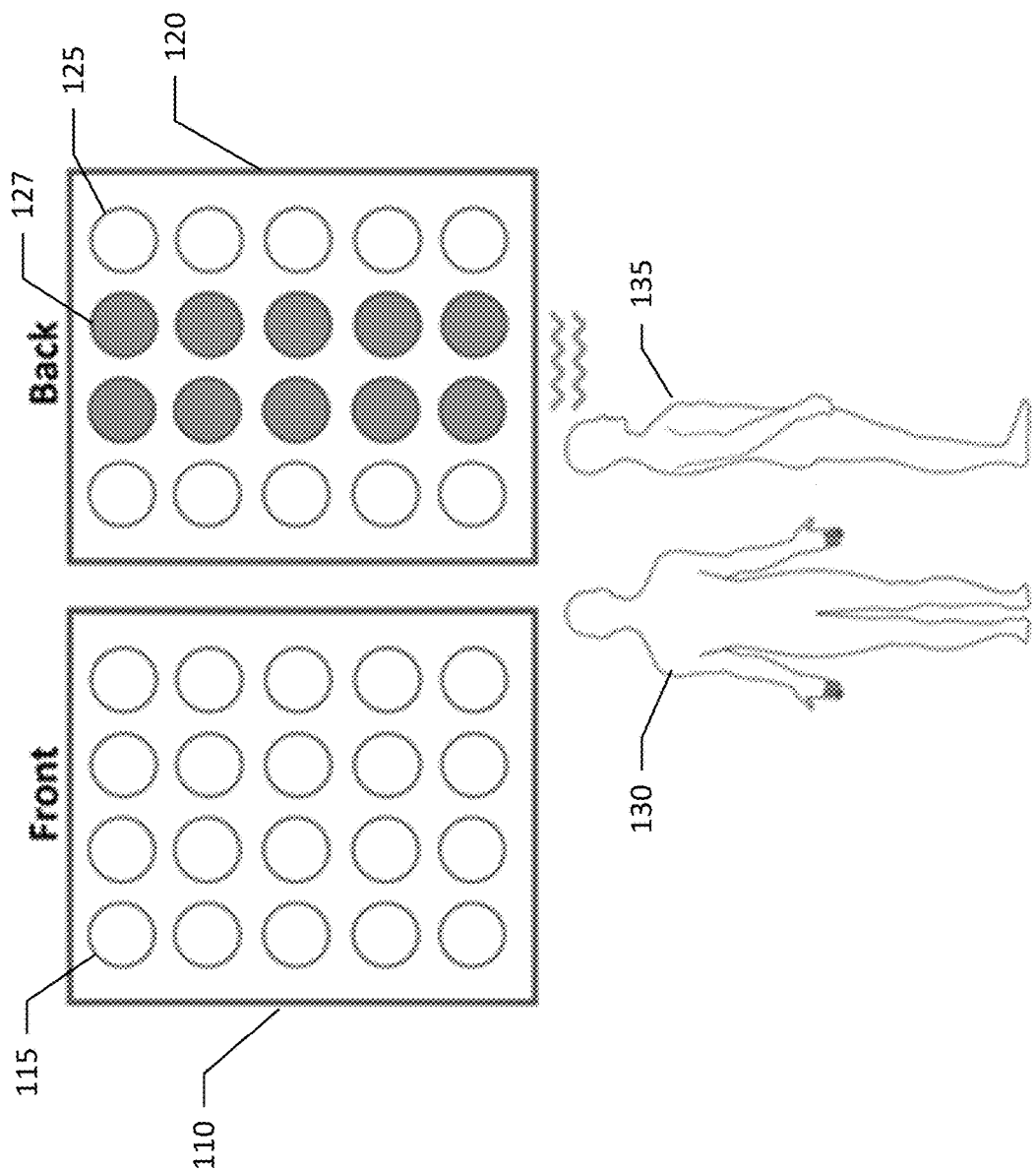
Figure 9:
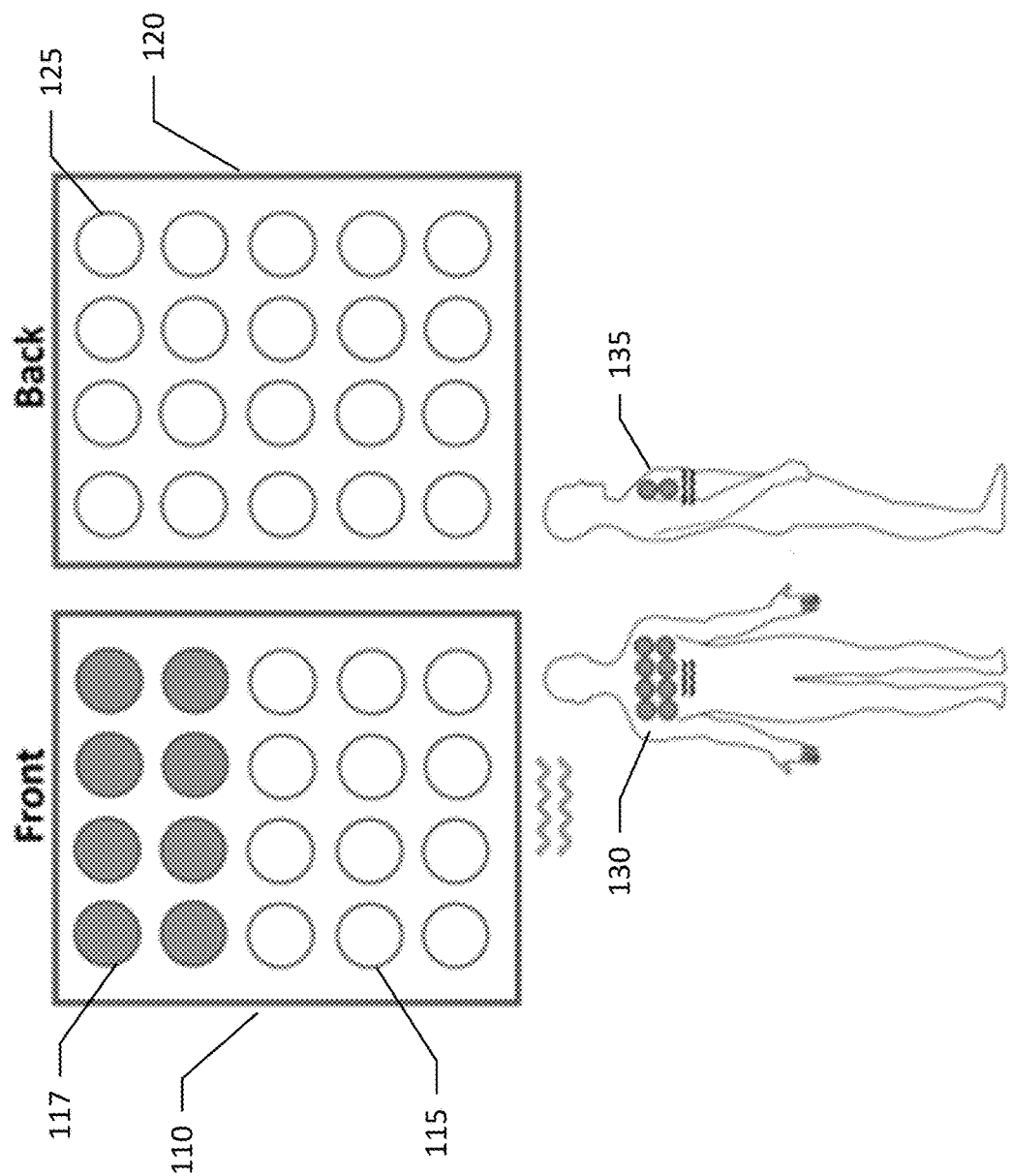
Figure 10:
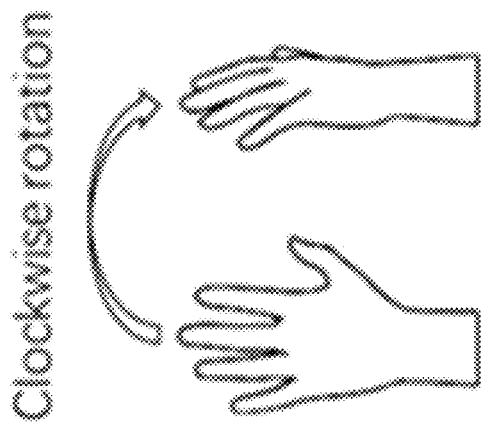
Figure 10:
Figure 10:
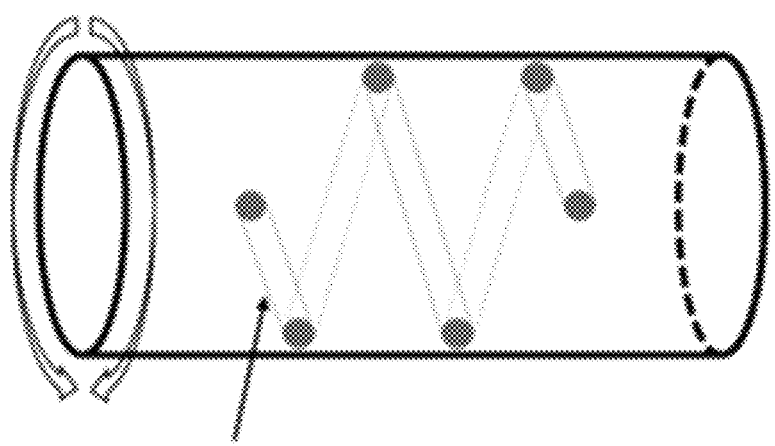

Having thus described certain embodiments of the present disclosure in general terms, reference will now be made to the accompanying drawings, which are not necessarily drawn to scale, and wherein:

FIG. 1 illustrates a diagram of a snake robot in a pipe according to an example embodiment of the present disclosure;

FIG. 2 illustrates a block diagram of a controller configured for teleoperation of a snake robot according to an example embodiment of the present disclosure;

FIG. 3 illustrates a haptic suit and array of mounts for vibrating modules according to an example embodiment of the present disclosure;

FIG. 4 illustrates an array of vibrating modules overlaid on the upper body of a wearer according to an example embodiment of the present disclosure;

FIG. 5 illustrates a vibrating module array for an upper body worn haptic feedback device according to an example embodiment of the present disclosure;

FIG. 6 illustrates a vibrating module array for an upper body worn haptic feedback device with a first set of vibrating modules activated according to an example embodiment of the present disclosure;

FIG. 7 illustrates a vibrating module array for an upper body worn haptic feedback device with a second set of vibrating modules activated according to an example embodiment of the present disclosure;

FIG. 8 illustrates a vibrating module array for an upper body worn haptic feedback device with a third set of vibrating modules activated according to an example embodiment of the present disclosure;

FIG. 9 illustrates a vibrating module array for an upper body worn haptic feedback device with a fourth set of vibrating modules activated according to an example embodiment of the present disclosure; and FIG. 10 illustrates gesture control of a snake robot according to an example embodiment of the present disclosure.

DETAILED DESCRIPTION

The present disclosure now will be described more fully hereinafter with reference to the accompanying drawings, in which some, but not all embodiments are shown. Indeed, this disclosure may be embodied in many different forms and should not be construed as limited to the embodiments set forth herein; rather, these embodiments are provided so that this disclosure will satisfy applicable legal requirements. Like numbers refer to like elements throughout.

Operations in confined spaces, such as in-pipe inspections in the oil and gas industry, power plants, and other industrial facilities are difficult and dangerous. Working in such an environment often presents a high risk due to the potential safety hazards or substances from electrical, mechanical, and chemical systems. Low visibility and confined spaces are significant impediments to a worker's mobility and ability to perform tasks in a safe and effective manner. To overcome these challenges, embodiments described herein provide remote mobile robots in combination with teleoperation to perform tasks in confined spaces in a manner that is intuitive and effective. Embodiments provided herein provide for teleoperation of robots as an extension of a human operator's sensing, decision making, and manipulation capability in a remote workspace to provide a clear added value to a variety of applications and industries that benefit from such confined workspace challenges.

Teleoperation robots can reduce potential risks and make hazardous confined spaces more accessible to human workers. Notably, snake robots that are robotic mechanisms designed to move like a biological snake can provide benefits over wheeled and legged robots in irregular, narrow, and challenging environments. Snake robots often consist of serially connected joint modules capable of bending in one or more planes and thus are more mobile by twisting their high degree-of-freedom bodies. Snake robots are an effective model of teleoperation robots for civil engineering operations.

The teleoperation of snake robots faces unique challenges pertaining to the sensing and perception of the state of the robot and the locomotion controls. Specifically, snake robots generally are used for environments that are more constrained, such as environments with lower visibility, confined spaces, and fewer anchoring landmarks and navigational points. Visual feedback, such as a camera streaming from a remote snake robot, is insufficient for capturing spatial information and robot states in an intuitive manner. The locomotion control of snake robots is complex, particularly with respect to navigation. For snake robots, the challenging work environments can disturb sensor systems of the robot and render them difficult for implementation of full autonomy. For example, Global Positioning Systems (GPS) and magnetometers are often ineffective in the work environment of a snake robot. Traditional vision-based targeted tracking techniques can be compromised due to low visibility and feature sparsity (e.g., landmarks). For teleoperation, traditional control methods cannot provide sufficient information to support comprehensive perception about the dynamic environment and robot location. Further, human decision-making is impaired by such environments as are actions to ensure safe operation of the system.

With respect to in-pipe inspection, remotely controlled snake robots cannot be observed directly by an operator during operation. The in-pipe snake robots often encounter slippage as sudden unintended movement such as falling. The periodic swings of the robot can lead to blurred imagery signals and unstable camera views. While in other robot teleoperation applications a human operator may rely on spatial understanding to localize and navigate a remote robotic system, such as in piloting a drone, the in-pipe environment is generally difficult for the perception of direction and orientation. The indistinguishable structures and textures, in combination with the dim light conditions, make the wayfinding process more challenging for a human operator. Further, humans naturally locomote on two-dimensional surfaces in a gravitationally upright orientation such that the human cognitive system has specialized for the terrestrial conditions. Yet the locomotion of the snake robots inside the pipeline refers to a three-dimensional navigational task as pipeline systems often include both vertical and horizontal extensions.

Embodiments provided herein employ a haptic feedback system to convey spatial and environmental information that can be perceived quickly and efficiently without burdening the visual or auditory channels, which are generally occupied by the task at hand. Embodiments provide a strategy to handle the control and feedback issues of snake robot teleoperation via a sophisticated haptic assistant system. Embodiments improve the human operator's spatial awareness. To accomplish such assistive systems, embodiments create new sensations from the haptic feedback in perceptual-motor abilities. Embodiments provided herein employ an upper-body haptics-based assistive interface with vibroactive feedback of spatial orientation during the navigation of a snake robot. Through the system, sensor data about the gravitational information from the remote snake robot can be transferred to the human operator in an intuitive way. An upper-body haptic suit of an example embodiment includes a plurality of vibrators on both the front and back side of a human operator to generate haptic feedback corresponding to the top and bottom sides of a snake robot, transferring the egocentric sensation of the snake robot to the human operator.

Helical drive robots, often designed as snake robots, are adaptable to changing in-pipe conditions and are an effective approach for maneuvering inside of pipelines. However, the snake robot teleoperation performance is sensitive to the human operator's motor skills and their ability to maintain situational awareness. There are several factors that affect human operators' perceptions. The limited field-of-view brings a "keyhole" effect where the human operator cannot fully survey the environment with only a portion of the view from the camera field-of-view. Orientation in the remote environment can also be challenging at times as the demand for mental rotation or planning for complex locomotion such as rotating the posture of the robot. A mismatch between viewpoints from the human operator and the original locomotion intent can happen, leading to unexpected consequences such as a remote robot flipping over or rolling to the wrong direction. Degraded video signals due to long-distance operation, obstacles, or electronic jamming can also compromise the human operator's ability for distance and size estimation. Relying on the visual displays and manual control/input can be more challenging because of the unstable and/or unexpected movement of the remote robot. Cognitive task performance can also be affected such as time-sharing, selective attention, inductive reasoning, memorization, and spatial orientation due to low quality snake robot feedback. Embodiments address these issues to improve control methods for snake robot teleoperation for in-pipe operations and inspection.

To overcome the challenges related to snake robot teleoperation, embodiments use additional modalities of sensory feedback to supplement visual cues. Enhancing sensory feedback of teleoperators can help create an immersive environment and reduce the perceived task difficulty. Haptic and tactile feedback, such as generating skin-based and proprioceptive (e.g., body position, orientation, and movement information) is an effective mechanism for teleoperation. Tactile sensors mounted to a remote robot to build a visual model of the work environment enhances spatial sensing via haptic feedback. Using visual and vibrotactile feedback provides an operator with both direction and temporal information of contact events that can reduce collisions during operation. Haptic feedback improves the operator's situational awareness.

Haptic assistive systems described herein can include direct haptic aid (DHA) and indirect haptic aid (IHA). DHA guides the human operator towards a specific navigation direction or control goal by providing active force inputs to the control device (e.g., a steering wheel or joystick). The human operator is urged to comply with the provided force feedback to follow the control directions. In contrast, IHA aims to provide passive cues about a remote workspace to help a human operator become aware of the remote environment indirectly, while still offering the operator full authority to take control decisions.

An example embodiment of a haptic assistant system described herein is based on the locomotion mechanisms of typical snake robots. Snake robot locomotion in complex or confined environments like pipelines is challenging. To maneuver a snake robot through in-pipe structures of a constant diameter a helical rolling motion can be employed. This mechanism also enables a snake robot to climb up and down inside vertical straight pipelines.

FIG. 1 is a simplified illustration of a snake robot 12 of an example embodiment within a pipe 10. As illustrated, the snake robot 12 includes a top side 13, a bottom side 14, and a head 15. The head of the snake robot 12 includes a light source and camera at 16. The light source provides illumination such that the camera can capture images within the dark environment. Optionally, the camera can be implemented as a LiDAR (light distancing and ranging) sensor, thermal imaging sensor, depth camera, sonic sensor, or other image capture sensor. The snake robot 12 head 15 further includes a sensor capable of discerning orientation of the snake robot. Such a sensor may include an accelerometer, pressure sensor, gyroscope, magnetometer, or the like. The snake robot 12 of example embodiments may be controlled remotely by a controller.

FIG. 2 is a schematic diagram of an example of a controller 20 that may be used to control a robot remotely as described herein. The controller 20 may include or otherwise be in communication with a processor 22, a memory device 24, a communication interface 26 and a user interface 28. As such, in some embodiments, although devices or elements are shown as being in communication with each other, hereinafter such devices or elements should be considered to be capable of being embodied within the same device or element and thus, devices or elements shown in communication should be understood to alternatively be portions of the same device or element.

In some embodiments, the processor 22 (and/or co-processors or any other processing circuitry assisting or otherwise associated with the processor) may be in communication with the memory device 24 via a bus for passing information among components of the apparatus. The memory device 24 may include, for example, one or more volatile and/or non-volatile memories. In other words, for example, the memory device 24 may be an electronic storage device (e.g., a computer readable storage medium) comprising gates configured to store data (e.g., bits) that may be retrievable by a machine (e.g., a computing device like the processor). The memory device 24 may be configured to store information, data, content, applications, instructions, or the like for enabling the haptic feedback device 30 to carry out various functions in accordance with an example embodiment of the present disclosure. For example, the memory device 24 could be configured to buffer input data for processing by the processor 22. Additionally or alternatively, the memory device could be configured to store instructions for execution by the processor, such as for controlling the snake robot 12.

The processor 22 may be embodied in a number of different ways. For example, the processor 22 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor 22 may include one or more processors configured in tandem via the bus to enable independent execution of instructions, pipelining and/or multithreading. The processor may be embodied as a microcontroller having custom bootloader protection for the firmware from malicious modification in addition to allowing for potential firmware updates.

In an example embodiment, the processor 22 may be configured to execute instructions stored in the memory device 24 or otherwise accessible to the processor 22. Alternatively or additionally, the processor 22 may be configured to execute hard coded functionality. As such, whether configured by hardware or software methods, or by a combination thereof, the processor 22 may represent an entity (e.g., physically embodied in circuitry) capable of performing operations according to an embodiment of the present disclosure while configured accordingly. Thus, for example, when the processor 22 is embodied as an ASIC, FPGA or the like, the processor 22 may be specifically configured hardware for conducting the operations described herein. Alternatively, as another example, when the processor 22 is embodied as an executor of software instructions, the instructions may specifically configure the processor 22 to perform the algorithms and/or operations described herein when the instructions are executed. However, in some cases, the processor 22 may be a processor of a specific device (e.g., a head-mounted display for augmented reality or virtual reality control of the snake robot) configured to employ an embodiment of the present disclosure by further configuration of the processor 22 by instructions for performing the algorithms and/or operations described herein. The processor 22 may include, among other things, a clock, an arithmetic logic unit (ALU) and logic gates configured to support operation of the processor 22. In one embodiment, the processor 22 may also include user interface circuitry configured to control at least some functions of one or more elements of the user interface 28.

The communication interface 26 may include various components, such as a device or circuitry embodied in either hardware or a combination of hardware and software that is configured to receive and/or transmit data for communicating instructions to a robot. In this regard, the communication interface 26 may include, for example, an antenna (or multiple antennas) and supporting hardware and/or software for enabling communications wirelessly. Additionally or alternatively, the communication interface 26 may include the circuitry for interacting with the antenna(s) to cause transmission of signals via the antenna(s) or to handle receipt of signals received via the antenna(s). For example, the communication interface 26 may be configured to communicate wirelessly such as via Wi-Fi (e.g., vehicular Wi-Fi standard 802.11p), Bluetooth, mobile communications standards (e.g., 3G, 4G, or 5G) or other wireless communications techniques. In some instances, the communication interface may alternatively or also support wired communication, which may communicate with a separate transmitting device (not shown). As such, for example, the communication interface may include a communication modem and/or other hardware/software for supporting communication via cable, digital subscriber line (DSL), universal serial bus (USB) or other mechanisms. For example, the communication interface 26 may be configured to communicate via wired communication with other components of a computing device.

The user interface 28 may be in communication with the processor 22, such as the user interface circuitry, to receive an indication of a user input and/or to provide an audible, visual, mechanical, or other output to an operator. As such, the user interface 28 may include, for example, one or more buttons, light-emitting diodes (LEDs), a display, a head mounted display (virtual reality headset and augmented reality headset), a joystick, a speaker, and/or other input/output mechanisms. The user interface 28 may also be in communication with the memory device 24 and/or the communication interface 26, such as via a bus. The user interface 28 may include an interface with the robot to provide operator instructions to the robot while receiving feedback from the robot. The user interface 28 optionally includes body motion trackers equipped in the haptic feedback system to control locomotion of the snake robot. The body motion trackers of such a user interface 28 can include accelerometers and/or inertial measurement units (IMUs) to sense the gesture change of the upper body. The tracked upper body gesture changes can control movement of the snake robot, such as through moving forward, moving backward, turning left, turning right, etc.

The communication interface 26 may facilitate communication between the robot 12, the user interface 28, and the haptic feedback device 30. The communication interface 26 may be capable of operating in accordance with various wired and wireless communication protocols. The controller may optionally include or be in communication with the haptic feedback device 30. The haptic feedback device may include various vibrating modules or devices configured to provide haptic sensation to an operator of the robot. In an example embodiment described further below, the haptic feedback device 30 is an upper-body worn device including an array of vibrating modules across the front of an operator's upper-body and an array of vibrating modules across the back of an operator's upper-body. Optionally, the modules may be configured to provide temperature sensations to an operator. The haptic feedback device of example embodiments is detailed below for use with teleoperation and control of a robot, such as a snake robot.

Embodiments described herein include an upper-body haptic assistant system or to support snake robot teleoperation based on the helical locomotion of the snake robot. While embodiments can employ lower-limb or whole-body haptic systems, a preferred embodiment uses an upper-body system also referred to herein as a haptic suit. The sensitivity level of haptic perception of direction is relatively higher in the upper-body than in the lower-body. The ability to localize a point of vibrotactile stimulation on the body is highest when presented on the body near anatomical points of reference, such as the wrist, elbow, spine, or navel. These upper-body points of reference are thus more effective to leverage in the haptics-based feedback system described herein. Using an upper-body haptic feedback system excluding arms and hands can minimize distraction during robot teleoperation. The haptic assistant system of example embodiments should not interfere with the operation of the robot. Since operation relies heavily on the forearms and hands using joysticks, avoiding haptic feedback on the arms and hands avoids interference with robot teleoperation. The haptic feedback of the upper-body system provided herein provides haptic feedback to both the spine and the navel to provide more efficient and intuitive spatial information assistance. Embodiments employ a haptic suit to simulate the "feeling" of a remote snake robot on the body of a human operator. Specifically, the front and back of the haptic suit correspond to the pressure sensing data of the belly and the back of the remote snake robot, respectively, projecting the contact events between the snake robot and the inner walls of the pipeline as dynamic haptic cues on both sides of the human operator's body.

The upper body haptic feedback system for snake robot teleoperation is designed to provide secondary information about the environment of the robot, such as pressure changes and hydrodynamic forces in underwater operations. Additional benefits of using a configurable haptic feedback system include providing real-time feedback on a user's body, replicating the sensations and movements of the robot. Embodiments provide tactile feedback on a user's body to indicate sudden changes in environmental conditions. The wearable haptic suit feedback system of certain embodiments employ a modular design to enable customization of the system to suit different users and task scenarios.

A snake robot of example embodiments can include a pressure sensor proximate the snake robot's head where a camera is attached. The pressure sensor is able to detect the pull of gravity such that the gravitational direction can be generated and converted into the haptic force direction signals. In this manner, embodiments of the haptic assistant system are indicative of the simulated gravity direction during snake robot locomotion. This gravitational direction indication assists a human operator to orient and navigate the snake robot.

An upper body haptic feedback system or "haptic suit" of example embodiments can be worn as a vest, with a first vibrating module array on the front of the vest and a second vibrating module array on the back of the vest. The figured provided herein include various representations of a haptic suit, where the haptic suit of FIGS. 3 and 4 include a potential of 92 total sensors, the embodiment of FIGS. 5 to 9 include a potential of 40 total sensors. While a total of 92 vibrating modules are shown in one embodiment and 40 vibrating modules are shown in another embodiment, the vibrating module arrays can include more or fewer vibrating modules, which may be different numbers from front to back, and may be arranged in an irregular pattern or a pattern that conforms to the anatomy of an operator.

The haptic suit of embodiments described herein features a flexible and adjustable base structure, which may be made from lightweight and durable materials such as high-strength fabric or polymer composites. The structure is configured to fit various body sizes and shapes comfortably. The front and back sides of the haptic suit of an example embodiment illustrated in FIG. 3 can include 46 mounting bases affixed to the haptic suit on each of a front side 40 and a back side 50 of the haptic suit for a total of 92 mounting bases. The illustration of FIG. 3 depicts the mounting bases including vacant mounting bases 42 and mounting bases with vibrating modules 44 affixed. FIG. 4 illustrates general positioning of the haptic suit and the associated vibrating modules 44 and mounting bases 42 as worn on a user. The mounted vibrating modules 44 can range from 0 to 92. According to some embodiments, and depending upon the size and total number of vibrating modules, to avoid the disturbing issues related to the sounds of vibrations, the number of activating vibrating modules may be limited. According to an example embodiment, the distance between two neighboring mounting bases is about one inch. The haptic suit itself features an ergonomic design that conforms to the natural contours of the human body. This can involve elements such as adjustable straps, stretchable panels, or padding in strategic locations to provide a secure fit and distribute pressure evenly across the wearer's body. Optionally, the haptic suit can incorporate modular sizing, where users can add or remove sections of the base structure to better fit their body dimensions. The design of some embodiments can also include ventilation zones or mesh panels to improve airflow and reduce heat buildup during prolonged use. The base structure of the haptic suit is designed with standardized attachment points, such as screw threads, snap-fit connections, magnetic attachment mechanisms, or the like. These bases placed strategically across the front and back sides of the haptic suit enable users to easily install, remove, and reposition the vibrating modules based on their needs.

The placement of the mounting bases on the haptic suit is important to cover key areas of the wearer's torso, allowing for effective tactile feedback. Further, as the suit may fit differently on different wearers, the array of mounting bases allows attachment of vibration modules at the strategic locations corresponding to the wearer and/or configuration of which mounting bases overlie a particular position on a wearer such that the haptic suit response can be tailored to a specific user. The locations of the vibration modules are chosen based on human anatomy and kinesthetic perception ensuring that the vibrating modules can effectively deliver tactile feedback regardless of their specific configuration.

Each mounting base is an attachment point for attachment of a vibrating module. According to some embodiments, each attachment point is associated with a particular position of a wearer of the haptic suit. The attachment point may inform a vibrating module attached to that particular attachment point of the particular position of the wearer. For example, the attachment point may be configured with a readable code (e.g., barcode, QR code, etc.) that provides an indication of that particular attachment point's position. That readable code can be read, such as by the vibrating module or by a reader that is used when the vibrating module is attached to the attachment point, to correlate the vibrating module with the attachment point to which it is mounted. Optionally, the attachment points may have NFC (near-field communication) devices, such as RFID (radio frequency identification) for identifying to a vibrating module a relative position on the wearer. The relative position of the attachment point to which a vibrating module is attached can be communicated with a controller such that the controller knows when to activate, deactivate, or change the intensity or frequency of vibration of that particular vibrating module.

The haptic suit of example embodiments includes a structure designed with seamless integration of the mechanical, electrical, and communication components. This includes channels or compartments for routing wires, embedded microcontrollers, or wireless communication modules. Proper integration ensures a clean and uncluttered design, reducing the risk of damage to internal components and enhancing the overall user experience.

The vibrating modules of example embodiments play a crucial role in the haptic suit as they are responsible for generating the tactile feedback that simulates the snake robot's movements. According to an example embodiment described herein, the core component of a vibrating module is the motor, which generates vibrations felt by a wearer of the haptic suit. According to example embodiments described herein, two types of motors may be employed. A first motor type includes linear resonant actuator (LRA) including a mass attached to a spring driven by a voice coil actuator. When an alternating current (AC) is applied to an LRA, the mass vibrates at its resonant frequency producing highly precise and responsive vibrations. LRAs are known for their low power consumption, fast response times, and wide frequency ranges. A second motor type includes an eccentric rotating mass (ERM) motor that includes a small, off-center mass attached to the shaft of a direct current (DC) motor. When the motor rotates, the imbalance caused by the off-center mass generates vibrations. ERM motors are a relatively simple design that is relatively inexpensive and more easily integrated. However, ERM motors have slower response times and lower precision compared to LRAs.

The motors used in the vibrating modules described herein are enclosed within housings which protect the motor from external factors such as dust, moisture, and impact. The housing may be made of a lightweight material, such as plastic or aluminum, and is designed to incorporate features such as ventilation for heat dissipation, noise reduction, and/or mounting points for mounting on the bases affixed to the haptic suit.

The vibrating module of example embodiments features a mounting interface that enables the vibrating module to be easily attached and removed from the bases of the haptic suit. This interface can include screw threads, a snap-fit connection, a magnetic attachment mechanism, or other mechanism that securely and releasably attaches the vibrating module to a respective base. The mounting interface ensures secure attachment of the vibrating modules while allowing users to customize their haptic feedback through reconfiguring the module positions.

Each vibrating module of an example embodiment is connected to the embedded microcontroller via electrical wiring or a flexible printed circuit (FPC). This connection allows the microcontroller to control the motor's operation to adjust its vibration frequency, intensity, and duration based on the snake robot's movements. Additionally, this connection may incorporate data lines for monitoring the motor's performance, such as temperature or current consumption, which can help optimize the haptic feedback and ensure safe operation.

To maximize the efficiency and effectiveness of the vibrating modules, it is important to minimize the transmission of vibrations to the haptic suit's structure or other modules. This can be achieved by incorporating damping materials, such as silicone or rubber, into the module's design. Further, isolation techniques such as suspensions systems or flexible mounts can be used to help prevent or mitigate unwanted vibrations from affecting a user's experience.

The microcontroller of each vibrating module receives data about the robot's movements and converts that movement into corresponding vibration patterns for the vibrating module. The microcontrollers can be programmed for different robot models offering versatility and adaptability. The primary function of the embedded microcontrollers is to receive data from the robot control system, such as position, orientation, and movement, and convert it into corresponding vibration patterns for the vibrating modules. The microcontrollers can further adjust the intensity, frequency, and duration of the vibrations based on the user's preferences or the specific application requirements. The system can employ common microcontroller families including ARM Cortex, Atmel AVR, or Microchip PIC among others. The choice of microcontroller depends on factors such as processing power, input/output capabilities, and power consumption. The microcontroller can be represented by the controller 20 of FIG. 2.

As shown in FIG. 2, the controller 20 includes communications interface 26. Similarly, the embedded microcontrollers can communicate with the robot through such a communications module, such as via wireless protocols including Bluetooth or Wi-Fi, or example. These communications interfaces enable low-latency data transmission between the robot and the haptic suit, ensuring communication protocols, such as UART, SPI, or I2C, for connecting to other peripherals or components within the haptic suit. The haptic suit of an example embodiment may be powered by a rechargeable battery pack or a wired connection to a power source. An efficient power management system is implemented to maximize battery life and ensure safe operation. This may include voltage regulators, current limiters, and thermal protection circuits.

The haptic suit of example embodiments described herein aims to cater to various users and applications, allowing for a high degree of customization based on individual needs. Different use case may require unique tactile feedback profiles as described herein. One such profile can include a pressure change profile for snake robots operating within a pipeline. The user may need to feel pressure changes within the pipeline. By concentrating a denser configuration of vibrating modules on a specific body area, such as the chest, the user can perceive pressure changes more accurately. As pressure levels increase, more vibrators will be activated, providing a multi-level haptic experience. Another profile can include surface smoothness detection. In search and rescue scenarios, a first responder may need to navigate a snake robot through rubble, requiring the user to feel the smoothness o the surface on the robot's belly. By deploying a dense configuration of vibrators in the user's belly area, high-resolution feedback can be provided without significantly increasing hardware costs. Orientation awareness profiles may be employed where a user needs to determine if the snake robot is upside down. A simple configuration involving one column of vibrators on the front and one column of vibrators on the back of the haptic suit can provide adequate feedback while minimizing power consumption and computational requirements.

Embodiments provided herein can be user configured to suit the specific needs or to replicate a recommended configuration. Such configuration may involve removing vibrators from less relevant body areas and installing them in more relevant areas, optimizing the tactile feedback experience. To streamline the reconfiguration process, the haptic suit can incorporate easy-to-use attachment mechanisms, such as the attachment mechanisms described above. This enables users to quickly and effortlessly move vibrators between different areas of the suit and body. For users who are unfamiliar with optimal vibrator configurations, embodiments can provide customization software or a smartphone/tablet app that can provide step-by-step guidance on reconfiguring the vibrators based on their specific use case.

The haptic suit's user interface, either integrated directly into the suit or accessible via a connected smartphone/tablet app enables users to monitor, configure, and adjust various settings related to haptic feedback, fit, and comfort. Users can adjust the intensity, frequency, and duration of vibrations for each individual vibrator module, creating a personalized feedback profile that caters to their specific needs and preferences. The user interface may provide options to adjust the suit's fit and comfort, such as tightening or loosening straps, modifying padding, or altering the position of the vibrating modules.

FIG. 5 illustrates a simplified diagram of an example embodiment of a haptic suit as described herein. As shown, the haptic suit may include vibrating modules 115 on a front 110 of the suit, and vibrating modules 125 on a back 120 of the suit. Also shown is a diagram of a wearer showing a front view 130 and side view 135. The illustrated embodiment depicts five rows and four columns of vibrating modules; however, as noted above, the number and spacing of the vibrating modules and mounts thereof can be varied and may be determined based on use case. FIG. 6 illustrates an example embodiment of activated vibrating modules 117 on the front 110 of the haptic suit. Solid circles represent activated vibrating modules 117, while hollow circles represent inactive vibrating modules 115. The activated vibrating modules 117 on the front 110 of the haptic suit shown in FIG. 6 may be used to indicate an orientation that a snake robot is right side up, for example. This vibratory pattern can further indicate the snake robot's initial state (rotation=0°, the gravity pointing to the belly of the snake robot). The unshaded circles represent vibrating modules not active, while shaded circles represent active, vibrating modules.

FIG. 7 illustrates an example embodiment of activated vibrating modules 117 and 127 on a single side of the wearer shown at 135, which may be indicative of contact that the robot has made on a right side of the robot. For horizontal navigation, an initial state may be shown in FIG. 8 with the activation of ten vibrating modules of the back 120 shown as active vibrating modules 127 in the middle of the back of the operator. This vibratory pattern can indicate the snake robot's initial state (rotation=0°, the gravity pointing to the middle of the back of the snake robot) but inverted (i.e., on the robot's back). The unshaded circles represent vibrating modules not active, while shaded circles represent active, vibrating modules.

During the locomotion, as the gravitational direction of the snake robot side is gradually changed due to its helical corkscrew motion, haptic stimuli of example embodiments shift from the front side to the back side to indicate gravitational direction changes. For example, the rotation of the snake robot turns continuously to 90° (clockwise), the intensity is reduced for the vibrators at the central columns (those shown shaded in FIG. 8) and increased for vibrators at the right-side columns as depicted in FIG. 9 and reflected on the FIG. 135 where the vibrating modules vibrate on the side of the torso of the operator.

When the stimuli shift to the middle columns at the backside as illustrated in FIG. 8, this is an indication that the snake robot is upside down (rotation=180°, the gravity pointing to the back of the snake robot). When the snake robot is climbing or descending vertically, according to an example embodiment, only those vibrating modules on the front side are employed. For vertical ascent/descent, as the direction of gravity is parallel with the snake robot's moving direction, a first pattern may indicate moving up through the vertical pipeline, and a second pattern may indicate moving down through the vertical pipeline. FIG. 9 illustrates a pattern of vibrating modules indicating upward vertical movement.

The haptic assistant system of embodiments described herein is integrated with the snake robot control system. To navigate the snake robot inside a pipeline, a joystick can be used to advance the snake robot to move forward and to turn. When the snake robot moves through a straight pipeline, the human operator commands positive vertical values through the joystick to push the snake to move forward with constant velocity. As the robot encounters a junction, the operator needs to manually initialize a bend in the left or right direction based on the robot local frame direction to make a turn. Embodiments provided herein can further employ a visual indication on a display (e.g., the display where camera images from the robot are displayed) where the visual indication provides information regarding the gravitational direction relative to the robot camera view. A multi-modality interface of example embodiments incorporates both haptic and visual interfaces during operation.

While a joystick or controller interface can be used to control a robot, such as a snake robot described herein, example embodiments further include a gesture control system. A hand gesture control method for a robot control involves interpreting the user's hand movements and translating them into corresponding actions for the robot. This control process offers an intuitive and user-friendly way of controlling the snake robot without the need for complex input devices. Combining a hand gesture control method with a haptic suit can create a highly intuitive and immersive teleoperation experience for complex robot operations. The hand gesture control method described herein simplifies user input while the haptic suit provides real-time tactile feedback, enhancing the user's situational awareness and control precision.

To recognize hand gestures, a system that can track and analyze hand movements is required. This can be achieved using various techniques, such as a wearable device including a glove or wristband, employing sensors. The sensors can include accelerometers, gyroscopes, flex sensors, inertial measurement units (IMUs), etc. to capture hand movement dat. These devices can wirelessly transmit the data to the control system for gesture recognition and interpretation. Alternatively or in addition to wearable devices, camera-based tracking can be employed. In such an embodiment, a depth-sensing or motion tracking camera embedded with a virtual reality headset can be used to track a user's hand movements in real-time. These cameras employ computer vision algorithms to recognize hand gestures and to generate corresponding commands for the robot.

For gesture control, a predefined set of hand gestures needs to be established as a gesture vocabulary for controlling the robot. These gestures should generally be intuitive and easy to learn, along with being distinct from one another to prevent confusion or misinterpretation. Example gestures can include moving a hand forward or backward to control forward and backward motion. Rotation of a hand clockwise or counterclockwise, as shown in FIG. 10, can control a robot's rotation direction. Opening or closing a hand can be used to control the robot's movement or to stop. Pinching or spreading fingers can be used to control the robot's speed.

The control system of an example embodiment processes captured hand gesture data and can map that data to corresponding actions for the robot. This gesture mapping can employ machine learning algorithms, rule-based systems, or other techniques to accurately interpret the user's hand movements and generate appropriate commands. To ensure effective control, the system of example embodiments can provide real-time feedback to a user regarding the robot's actions and status. This can be achieved through visual or auditory cues, or by incorporating the haptic feedback through the haptic suit.

According to an example implementation of embodiments described herein, a robot may need to quickly dodge or avoid moving obstacles. In such a scenario, the user may need to guide the robot through a hazardous area filled with moving obstacles, such as debris in a disaster-stricken location or equipment in a dynamic industrial environment. Using the combined benefits of the haptic suit and the hand gesture control, the user can effectively navigate the robot through the area while avoiding collisions, maintaining a high level of situational awareness, and reacting quickly to challenging conditions. This integrated system can significantly improve a user's ability to complete a task safely and efficiently, while minimizing the risk of damage to the robot or its surroundings.

The combined use of the gesture control and haptic suit feedback mechanism has several advantages. The hand gesture control methods are intuitive and allow users to control a robot, such as a snake robot, using natural hand movements. This reduces the learning curve and renders it easier for operators to adapt to complex tasks. In conjunction with the haptic suit, users can feel the robot's movements and interactions with the environment, creating a more intuitive and immersive experience. The haptic suit provides users with real-time tactile feedback about the snake robot's position, orientation, and contact with objects or surfaces. This information can be invaluable during complex operations, such as navigating through tight spaces or manipulating delicate objects. When combined with the hand gesture control method, users can make more informed decisions and adjustments based on the feedback they receive, thereby improving the overall control precision and success of the operation.

With gesture control, users can quickly and intuitively adjust a robot's movements using natural hand motions. This reduces the time it takes to input commands compared to traditional control interfaces, such as joysticks or keyboards, enabling the user to react faster to the changing positions of moving obstacles. As the user guides the robot through the moving obstacles using hand gestures, the haptic suit can provide immediate feedback on the success or failure of each maneuver. This real-time feedback loop enables the user to quickly adapt their hand movements and strategies in response to the robot's interactions with the obstacles, improving their ability to avoid collisions. The combination of hand gesture control and haptic feedback also reduces cognitive load on the user, allowing them to focus on the task at hand. This is particularly beneficial in high-pressure situations, such as avoiding moving obstacles, where quick decision making and precise control are crucial for success.

By offering an intuitive and immersive control experience, the combined use of the haptic suit and hand gesture control method instill confidence in the user's ability to navigate the snake robot through complex environments. This confidence can lead to better decision making and improved overall control during the task. The hand gesture control method and the haptic suit can reduce the need for other hardware systems for robot teleoperation. Embodiments described herein are generally portable. Both the hand gesture control method and the haptic suit can further be adapted to various applications and user preferences. Users can customize the gesture vocabulary and haptic feedback settings to suit their needs and specific tasks, ensuring a tailored and efficient teleoperation experience.

Snake robots have great potential in industrial operations in less accessible workplaces such as the in-pipe inspection embodiment described above. However, due to the complexity of the confined workspaces and snake robot locomotion controls, the teleoperation of snake robots remains a challenging task. Using only camera views from a snake robot for teleoperation provides little information about the spatial features of the remote workplaces or orientation information. Embodiments described herein provide an innovated snake robot teleoperation feedback system based upon an upper-body haptic system. The system of example embodiments is equipped with a plurality of vibrating modules on both the front side and the back side of a human operator, corresponding to the belly and the back of the remote snake robot, respectively. This configuration and strategy provides an intuitive feeling of the spatial orientation and gravitational direction of the remote snake robot.

Embodiments of the present disclosure including an upper-body haptic assistant system helps transfer the simulated sensation of the remote snake robot to the human operator, increasing the sense of telepresence and thus improving the snake robot teleoperation. Embodiments mitigate disorientation issues in remote control of snake robots due to the robot's helical locomotion patterns and the featureless in-pipe environment.

Many modifications and other embodiments of the disclosure set forth herein will come to mind to one skilled in the art to which these embodiments pertain having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A haptic feedback system for robot teleoperation comprising:
 a robot comprising a top side and a bottom side;
 a robot control; and
 an upper-body haptic feedback garment comprising a first vibrating module array of vibrating modules disposed across a front side of an upper body of an operator and a second vibrating module array of vibrating modules disposed across a back side of the upper body of the operator, wherein the first vibrating module array comprises a series of rows and columns of the vibrating modules and the second vibrating module array comprises a series of rows and columns of the vibrating modules,
 wherein the upper-body haptic feedback garment provides haptic feedback to the operator reflecting a position and orientation of the robot, and
 wherein activation of vibrating modules in a column of the first vibrating module array proximate a middle of the upper body of the operator provides an indication to the operator that the robot is oriented with the bottom side down relative to gravitational force.

2. The haptic feedback system of claim 1, wherein activation of the vibrating modules in a column of the second vibrating module array proximate a middle of the upper body of the operator provides an indication to the operator that the robot is oriented with the top side down relative to the gravitational force.

3. The haptic feedback system of claim 2, wherein activation of the vibrating modules in a row of the first vibrating module array proximate a top of the upper body of the operator provides an indication to the operator that the robot is oriented vertically, with a head of the robot oriented up relative to the gravitational force.

4. The haptic feedback system of claim 1, wherein the robot is a snake robot, and wherein a head of the snake robot comprises a camera and an accelerometer, wherein the accelerometer identifies orientation of the snake robot relative to gravity.

5. The haptic feedback system of claim 4, further comprising a display, wherein the display provides a view from the camera of the snake robot.

6. The haptic feedback system of claim 5, further comprising a user interface, wherein the user interface is controlled by an operator to guide movement of the snake robot.

7. The haptic feedback system of claim 5, wherein the upper-body haptic feedback garment provides haptic feedback to the operator responsive to movement of the snake robot guided by the operator with a user interface.

8. The haptic feedback system of claim 5, further comprising a body motion controller to guide movement of the snake robot.

9. The haptic feedback system of claim 8, wherein the body motion controller comprises one or more sensors worn by an operator and is configured to translate body motion of the operator into movement guidance for the snake robot.

10. A method for robot teleoperation with haptic feedback comprising:
receiving control of a robot from an operator at a user interface, wherein the robot comprises a top side and a bottom side; and
providing haptic feedback to the operator through an upper-body haptic feedback garment, wherein the haptic feedback is provided by a first vibrating module array comprising a series of rows and columns of vibrating modules disposed across a front side of an upper body of an operator and a second vibrating module array comprising a series of rows and columns of vibrating modules disposed across a back side of the upper body of the operator, wherein the haptic feedback to the operator reflects a position and orientation of the robot,
activating the vibrating modules in a column of the first vibrating module array proximate a middle of an upper body of the operator to provide an indication to the operator that the robot is oriented with the bottom side down relative to gravitational force.

11. The method of claim 10, further comprising:
activating the vibrating modules in a column of the second vibrating module array proximate a middle of the upper body of the operator to provide an indication to the operator that the robot is oriented with the top side down relative to the gravitational force.

12. The method of claim 11, further comprising:
activating the vibrating modules in a row of the first vibrating module array proximate a top of the upper body of the operator to provide an indication to the operator that the robot is oriented vertically, with a head of the robot oriented up relative to the gravitational force.

13. A haptic feedback system for robot teleoperation comprising:
a robot wherein the robot is a snake robot, and wherein a head of the snake robot comprises a camera and an accelerometer, wherein the accelerometer identifies orientation of the snake robot relative to gravity;
a robot control; and
an upper-body haptic feedback garment comprising a first vibrating module array disposed across a front side of an upper body of an operator and a second vibrating module array disposed across a back side of the upper body of the operator,
wherein the upper-body haptic feedback garment provides haptic feedback to the operator reflecting a position and orientation of the robot.

14. The haptic feedback system of claim 13, wherein the first vibrating module array comprises a first array of vibrating modules, wherein the second vibrating module array comprises a second array of vibrating modules.

15. The haptic feedback system of claim 14, wherein the first vibrating module array comprises a series of rows and columns of the vibrating modules and the second vibrating module array comprises a series of rows and columns of the vibrating modules.

16. The haptic feedback system of claim 13, further comprising a display, wherein the display provides a view from the camera of the snake robot.

17. The haptic feedback system of claim 16, further comprising a user interface, wherein the user interface is controlled by an operator to guide movement of the snake robot.

18. The haptic feedback system of claim 16, wherein the upper-body haptic feedback garment provides haptic feedback to the operator responsive to movement of the snake robot guided by the operator with a user interface.

19. The haptic feedback system of claim 16, further comprising a body motion controller to guide movement of the snake robot.

20. The haptic feedback system of claim 19, wherein the body motion controller comprises one or more sensors worn by an operator and is configured to translate body motion of the operator into movement guidance for the snake robot.

* * * * *